UNITED STATES PATENT OFFICE.

GILBERT R. GLADDING, OF PROVIDENCE, RHODE ISLAND.

IMPROVED ARTIFICIAL FUEL.

Specification forming part of Letters Patent No. 47,296, dated April 18, 1865.

*To all whom it may concern:*

Be it known that I, GILBERT R. GLADDING, of the city and county of Providence, in the State of Rhode Island, have invented a new Artificial or Composition Fuel; and I do hereby declare that the following specification is a full, clear, and exact description thereof, and of the process by which the same is made.

I am aware that numerous attempts have been made to render useful as an article of fuel the coal-dust which accumulates in great quantities in all city coal-yards, and which has heretofore been allowed to be wasted as refuse material. None of these attempts, to my knowledge, have been practically successful, for the reason, as I suppose, that no element has been introduced in such compositions of a more combustible character than the dust of anthracite coal, of which the principal part of the mass is composed, to compensate for the addition of non-combustible adhesive materials necessary to be used to cause the particles of coal-dust to be cemented together to form a mass.

I have succeeded in producing an artificial fuel which can be made with great economy, and which will burn with entire freedom without the lumps losing their form until all combustible elements are consumed, by the use of the dust of coke, in combination with the dust of anthracite coal, in sufficient quantity to compensate for the quantity of non-combustible adhesive material necessary to be used.

I take seventy-five pounds of anthracite-coal dust and mix with it twenty-five pounds of the dust of coke. I then mix with this quantity of dust about sixteen pounds of fresh-slaked lime and four pounds of adhesive clay. The whole mass should then be properly tempered to reduce it to a uniform consistency. I then mold it into cakes under pressure by any of the modes in use for working clay or peat, for the purpose of solidifying the mass and expressing the water.

The proportions above given I have found to be the best; but the success of the process does not depend upon the use of these precise proportions, but upon having the amount of coke-dust equal to or in excess of the necessary amount of adhesive material. The result is an article of fuel which burns freely, and in the course of combustion develops a large amount of heat, and preserves its integrity until it is entirely consumed.

What I claim as my invention, and desire to secure by Letters Patent, is—

A composition fuel composed of the combustible materials above mentioned, in combination, substantially as described, and held in a mass by lime and adhesive clay or similar substances, as specified.

GILBERT R. GLADDING.

Witnesses:
W. B. VINCENT,
J. D. THURSTON.